(12) United States Patent
Bishop (10) Patent No.: US 9,143,385 B2
(45) Date of Patent: *Sep. 22, 2015

(54) LINKING FUNCTIONALITY FOR ENCODING APPLICATION STATE IN LINKED RESOURCES IN A STATELESS MICROKERNEL WEB SERVER ARCHITECTURE

(71) Applicant: Elastic Path Software, Inc., Vancouver (CA)

(72) Inventor: Matthew D. Bishop, North Vancouver (CA)

(73) Assignee: Elastic Path Software, Inc., Vancouver (CA)

( * ) Notice: Subject to any disclaimer, the term of this patent is extended or adjusted under 35 U.S.C. 154(b) by 448 days.

This patent is subject to a terminal disclaimer.

(21) Appl. No.: 13/646,052

(22) Filed: Oct. 5, 2012

(65) Prior Publication Data

US 2013/0179946 A1 Jul. 11, 2013

Related U.S. Application Data

(60) Provisional application No. 61/584,037, filed on Jan. 6, 2012.

(51) Int. Cl.
*G06F 21/00* (2013.01)
*G06F 21/30* (2013.01)
(Continued)

(52) U.S. Cl.
CPC .......... *H04L 29/08072* (2013.01); *H04L 29/06* (2013.01); *H04L 67/02* (2013.01); *H04L 67/142* (2013.01); *H04L 67/42* (2013.01)

(58) Field of Classification Search
CPC .......... G06F 21/00; G06F 21/30; H04L 29/06

USPC .............................................................. 726/4
See application file for complete search history.

(56) References Cited

U.S. PATENT DOCUMENTS 6,996,828 B1 * 2/2006 Kimura et al. ................ 719/319
2004/0205149 A1 * 10/2004 Dillon et al. .................. 709/217

(Continued)

OTHER PUBLICATIONS

ISA Canada, International Search Report of PCT/CA2013/050002, Mar. 14, 2013, WIPO, 11 pages.

(Continued)

*Primary Examiner* — William Powers
(74) *Attorney, Agent, or Firm* — Alleman Hall McCoy Russell & Tuttle LLP (57) ABSTRACT

A method of serving a resource to a client via a computer network is provided. The method may include at an HTTP server system having a stateless microkernel architecture, the server system including one or more link resource servers, receiving an HTTP request for a resource from an HTTP client via a computer network, the request being to perform a resource operation, the resource operation being to retrieve the resource and send the resource to the requesting client, wherein the resource is a data object. The method may further include determining if the resource operation is authorized based on the request. If the resource operation is authorized, the method may include sending the resource operation to an object server associated with the resource identified by the request, in response receiving a data object from the object server, providing, via a linking engine, the data object to each link resource server of the one or more link resource servers, in response receiving one or more links from each of the one or more link resource servers, embedding the links in the data object, and sending the data object to the requesting client via the computer network.

20 Claims, 4 Drawing Sheets

(51) Int. Cl.
  *H04L 29/06* (2006.01)
  *H04L 29/08* (2006.01)

(56) References Cited

U.S. PATENT DOCUMENTS

| | | | |
|---|---|---|---|
| 2005/0044242 A1* | 2/2005 | Stevens et al. | 709/228 |
| 2006/0015401 A1* | 1/2006 | Chu et al. | 705/14 |
| 2008/0195712 A1* | 8/2008 | Lin et al. | 709/206 |
| 2008/0215755 A1 | 9/2008 | Farber et al. | |
| 2009/0249194 A1* | 10/2009 | Day | 715/239 |

OTHER PUBLICATIONS

European Patent Office, Partial Supplementary European Search Report of EP13733889.3, Germany, Feb. 5, 2015, 5 pages.

Liskin, Olga et al.,"Teaching Old Services New Tricks: Adding HATEOAS Support as an Afterthought", Proceedings of the Second International Workshop on RESTful Design, Hyderabad, India, Mar. 28, 2011, 8 pages.

Fielding, R., "Architectural Styles and the Design of Network-based Software Architectures; Chapter 5; Representational State Transfer (REST)," http://www.ics.uci.edu/~fielding/pubs/dissertation/rest_arch_style.htm, Doctoral dissertation, University of California, Irvine, 2000, 17 pages.

"HATEOAS," Wikipedia Foundation, Inc., http://en.wikipedia.org/wiki/HATEOAS, Updated Apr. 12, 2012, 2 pages.

"Microkernel," Wikipedia Foundation, Inc., http://en.wikipedia.org/w/index.php?title=Microkernel&oldid=513118058, Updated Sep. 17, 2012, 10 pages.

Bishop, Matthew D., "Stop Condition Functionality in a Stateless Microkernel Web Server Architecture," U.S. Appl. No. 13/734,143, 68 pages, 2013.

Bishop, Matthew D., "Follow Location Handler and Selector Functionality in a Stateless Microkernel Web Server Architecture," U.S. Appl. No. 13/633,008, 56 pages, 2012.

Bishop, Matthew D., "Stateless Microkernel Web Server Architecture with Self Discoverable Objects," U.S. Appl. No. 13/734,096, 82 pages, 2013.

* cited by examiner

LINKING FUNCTIONALITY FOR ENCODING APPLICATION STATE IN LINKED RESOURCES IN A STATELESS MICROKERNEL WEB SERVER ARCHITECTURE

CROSS REFERENCE TO RELATED APPLICATIONS

This application claims priority from U.S. Provisional Patent Application No. 61/584,037, filed Jan. 6, 2012 and entitled ENCODING APPLICATION STATE IN LINKED RESOURCES IN A STATELESS MICROKERNEL WEB SERVER ARCHITECTURE, the entirety of which is hereby incorporated herein by reference for all intents and purposes.

BACKGROUND

Representing the state of user sessions of client-server interactions is a challenging task, and conventional client-server systems represent state using a variety of software architectures. For example, some systems may save session state in a cookie on the client, while other systems may save the state in a data file on the server or utilize server sessions to track state. Yet other systems may communicate state through the networked resources themselves.

One example of the latter approach is the HATEOAS (Hypermedia as the Engine of Application State) REST (Representational State Transfer) style of software architecture. The REST architecture is a style of software architecture utilized by distributed hypermedia systems, such as the World Wide Web (WWW), that attempts to represent application state over a computer network via linked hypermedia. Software systems that comply with the principles of REST architecture are client-server based, stateless, layered, cacheable, optionally utilize on-demand code, and maintain a unified interface between the clients and servers.

HATEOAS is a constraint of the REST architecture that specifies all interaction between client(s) and server(s) is accomplished through hypermedia dynamically provided by the server(s). In principle, interactions utilizing such an approach may not require an intermediary session state (i.e., state may be completely represented in the hypermedia itself). A typical HATEOAS system is composed of discrete resources (objects), each of which has a consistent address (e.g., Uniform Resource Location "URL") that can be accessed by a requesting client over a computer network, such as the Internet. Each individual resource also has a consistent representation, which is indicated by a MIME (Multipurpose Internet Mail Extensions) type defined via the HTTP 'Content-Type' header for the resource. The representations can be encoded and transmitted between the server and client in any suitable format, such as JSON and XML, for example.

Resources of a typical HATEOAS system are inter-related via relationships that are defined exclusively by links embedded in the data object which is a representation of each resource. In other words, as a HATEOS system is "stateless" in principle, the state of the system is contained in the resources themselves and the links between resources. Each link includes a "REL" field defining the name of the relationship to the other resource and a "HREF" field defining the address (e.g., URL) to the other resource. During client-server interactions, a HATEOAS system provides four actions on resources: GET, POST, PUT, and DELETE.

In practice, the REST HATEOAS architectural style has numerous deficiencies, which the present invention has been conceived to address. For example, in the REST HATEOAS architecture, additional information is included within the HTTP header, thus tying a typical HATEOAS system to the HTTP protocol itself. Such a configuration may therefore render the typical system unusable with protocols other than HTTP. To address this deficiency, the embodiments disclosed herein remove the HTTP protocol and provide the semantics in a more neutral manner, thereby allowing for client-server interaction across a variety of protocols, if desired. Nonetheless, the HTTP protocol may be one of the protocols, among others, used to engage a system in accordance with embodiments of the present disclosure.

A second deficiency of the REST HATEOAS architecture arises once the objects are separated from their HTTP receiver endpoint. Specifically, the objects lose the content type and URL identity, and therefore this information must be provided via other mechanism(s). Thus, the disclosed embodiments embed this information in a data structure, referred to as the "self entity," of the object itself.

A third deficiency of the REST HATEOAS architecture is that the 'Content-Type' headers must transmit two distinct pieces of information: the type of the object and the encoding method. In typical systems, these two pieces of information may be concatenated with a "+" symbol within the HTTP header string. However, this practice obfuscates both pieces of information, and potentially makes processing of incoming requests from clients difficult and/or error-prone. Accordingly, the disclosed embodiments move the MIME type of the object into the above-mentioned self entity, and preserve the 'Content-Type' HTTP header for the purpose of expressing the object encoding method, such as JSON, XML, etc.

A fourth deficiency of the REST HATEOAS architecture is that a URL of a resource is a poor identifier in a complex, highly scaled web server implementation. For example, once a client accesses the system on one server, all the links in the representations are typically configured to point to the same server instance, thus "sticking" that client to that server instance. Thus, in practice, a scaled deployment utilizing a pool of servers must rely on a single entry point, such as a server load balancer, that routes request(s) from requesting client(s) to a particular server within the pool of servers. The servers in the pool must know the name of this entry point and construct their URLs to point to this entry point explicitly. Furthermore, the object itself is highly inflexible and breakable as its URL points to a hard server entry point. For example, as the pool of available servers decreases as one or more severs become unavailable, URL reference(s) to the unavailable server(s) are lost. As another example, as the pool of available servers increases, the clients that are stuck to particular server instances may not be able to utilize the additional computing resources, thereby leading to unbalanced server loading.

More importantly, by combining the server location and the URI of the resource together to form the URL, a typical system breaks a central REST tenet, namely, statelessness. The disclosed embodiments address these issues by separating the identity of the object from the server that provided the object. This identity, referred to as the URI, is stored in the above-described "self" entity and can be used to address the same logical resource on one or more other server instances.

As a fifth deficiency, the REST HATEOAS architecture has no concept of the user performing operations, and instead assumes completely anonymous interactions. Such a configuration is woefully impractical in most modern systems (e.g., e-commerce systems) where user authorization and/or authentication are required to consume resources and execute transactions. The disclosed embodiments address this issue by introducing the concept of a "resource operation," (e.g., action to be performed on a resource) and defining an "authorization server" to determine whether a requesting user is authorized to perform a given resource operation. Accordingly, all resource operations must provide a user identifier indicating the identity of the requesting user. The identity of the user may be an anonymous identifier, a user role identifier, or other identifier which does indicate personally identifiable information. Such a configuration may therefore allow the user to access resources that are dedicated exclusively to the user and/or to access resources that are dedicated to a particular "role" shared by the user and one or more other users.

The pool of available servers decreases as one or more severs become unavailable, URL reference(s) to the unavailable server(s) are lost. As another example, as the pool of available servers increases, the clients that are stuck to particular server instances may not be able to utilize the additional computing resources, thereby leading to unbalanced server loading.

More importantly, by combining the server location and the URI of the resource together to form the URL, a typical system breaks a central REST tenet, namely, statelessness. The disclosed embodiments address these issues by separating the identity of the object from the server that provided the object. This identity, referred to as the URI, is stored in the above-described "self" entity and can be used to address the same logical resource on one or more other server instances.

As a fifth deficiency, the REST HATEOAS architecture has no concept of the user performing operations, and instead assumes completely anonymous interactions. Such a configuration is woefully impractical in most modern systems (e.g., e-commerce systems) where user authorization and/or authentication are required to consume resources and execute transactions. The disclosed embodiments address this issue by introducing the concept of a "resource operation," (e.g., action to be performed on a resource) and defining an "authorization server" to determine whether a requesting user is authorized to perform a given resource operation. Accordingly, all resource operations must provide a user identifier indicating the identity of the requesting user. The identity of the user may be an anonymous identifier, a user role identifier, or other identifier which does indicate personally identifiable information. Such a configuration may therefore allow the user to access resources that are dedicated exclusively to the user and/or to access resources that are dedicated to a particular "role" shared by the user and one or more other users.

SUMMARY

A method of serving a resource to a client via a computer network is provided. The method may include at an HTTP server system having a stateless microkernel architecture, the server system including one or more link resource servers, receiving an HTTP request for a resource from an HTTP client via a computer network, the request being to perform a resource operation, the resource operation being to retrieve the resource and send its representation to the requesting client, wherein the representation is a data object. The method may further include determining if the resource operation is authorized based on the request. If the resource operation is authorized, the method may include sending the resource operation to an object server associated with the resource identified by the request, in response receiving a data object from the object server, providing, via a linking engine, the data object to each link resource server of the one or more link resource servers, in response receiving one or more links from each of the one or more link resource servers, embedding the links in the data object, and sending the data object to the requesting client via the computer network.

DETAILED DESCRIPTION

From the preceding discussion, it will be appreciated that HATEOAS is a constraint of the REST architecture that specifies all interaction between client(s) and server(s) is accomplished through hypermedia dynamically provided by the servers. REST systems are "stateless" in that each request from a client to a server contains all information necessary to interpret the request. This approach allows for a particular server to handle a request from a client regardless of whether or not that server has handled previous requests from that client.

In order to meet said constraints, each resource in a HATEOAS system is a network-addressable object accessible via a consistent Uniform Resource Locator (URL), and HATEOAS systems operate on these objects. In other words, the term "resource," as used herein, refers to a network addressable data object (hereinafter "object") that encompasses some meaningful concept. Each object includes all information necessary to understand how to interact with the corresponding resource, such as how to provide a "representation" of the resource (e.g., how to visually present the object to a user via a display device) and how to link to/from the resource. Before continuing, it will be understood that an object may "represent" a resource in that the object provides the current state of the resource, and the object may be usable by each requesting client to provide a "representation" of the object that may be dependent upon one or more characteristics of the client. In other words, as will be described in greater detail below, the same object may be usable to provide different "representations" on different clients. Put another way, a resource may be thought of as a software implementation of business logic, an object may be thought of as an encoding of that business logic, and a representation may be thought of as a manifestation of an object at the client device.

As one non-limiting example, an electronic commerce system utilizing the HATEOAS architecture may comprise a "shipping" resource to maintain shipping information, and thus to respond to requests (e.g., resource operations) for the shipping information (e.g., user account shipping information, available shipping methods, etc.). Similarly, the example e-commerce system may further comprise an "inventory" resource to maintain inventory information, a "price" resource to maintain pricing information, and a "cart" resource to maintain an online shopping cart. From this example, it will therefore be appreciated that the information provided by each resource may be related to (e.g., depend on, depend from, etc.) any one or more other resources.

A given resource may be related to one or more other resources defined by links within the object representing the resource. As one simple example, a saleable good resource may link to a current availability resource indicating the availability of a particular saleable good. As will be described in greater detail below, a HATEOAS system according to embodiments of the present disclosure provides a corresponding resource server for one or more resources, where each resource server is configured to maintain the resource and/or respond to external requests for the resource (e.g., provide links).

Continuing with the above example, the link to the cart link may subsequently be acted upon (e.g., upon actuation of a displayed "add to cart" button) in order to add the saleable good to the online shopping cart and/or to otherwise interact with the online shopping cart. In this way, state transitions are defined via the links, and one or more of the links may be acted upon in order to effect one or more of the transitions. Such a configuration therefore satisfies the central pillar of the REST architecture that all possible next-state transitions be defined within an object provided to the client.

In complex systems, e.g., e-commerce systems, factory floor systems, etc., such linking may be unduly burdensome due to the myriad of interconnected and interdependent rules, e.g. business rules, error handling, etc., which are inherent to such systems. This potential shortcoming has restrained widespread adoption of the HATEOAS architecture for typical complex systems. For example, in an e-commerce system, once a particular saleable good is recognized as out of stock, such an event may effect removal of the saleable good from an online shopping cart, provision of a request to reorder the good, changes to a product page, an increase in price to one or more related goods, provision of backorder notifications for pending transactions, and/or one or more other dependent actions. Failure to effect one or more of these dependent actions may lead to an undefined system state and/or may provide an unsatisfactory user experience. For example, if the available inventory of a particular saleable good is depleted without updating one or more affected resources, users of an e-commerce system may place an order for the saleable good without being aware that the item is out of stock.

Accordingly, typical complex systems may utilize non-HATEOAS architectures. These systems may be "exception-driven" or "error-driven" such that branching (e.g., business logic) is implemented upon occurrence of an exception/error. For example, in some embodiments, upon occurrence of an "out of stock" error/exception (e.g., upon trying to checkout with an out-of-stock product), typical systems may have to, for example: determine whether the product should still be orderable (e.g., via backorder), remove the "add to cart" button, remove the page from search results, etc. Such error-handling may be hardcoded into the client software, potentially requiring frequent updates to the client software as business rules are updated. In other embodiments, the "out of stock" error may simply be returned to the user, and the user may thus be expected to manually handle the error accordingly (e.g., remove out of stock items from cart before ordering). However, such a configuration relies heavily on the user, and may therefore provide inaccurate results and/or may otherwise degrade the user experience. As described below, the disclosed embodiments enable a client without knowledge of a complete set of business rules to present all available options to a user in a representation of the object presented to the user, and effect appropriate state transitions upon selection of an option.

It will therefore be appreciated that it may be desirable to "cluster" each of the business rules, decision logic, etc. around a corresponding resource server. In other words, the business rule(s) related to the maintenance of the "current availability" resource (e.g., reordering, out of stock notifications, etc.) may be instantiated within the logic of the "current availability" resource server. Such a configuration may therefore provide, for each resource, a single repository where logic related to the resource may be maintained. Accordingly, update(s) to the business rules, to link(s) between the resources, and or to the visual representations of the resources may potentially be updated on the server without extensive modification the client software. Furthermore, by instantiating such logic within one or more servers, and thus removing the logic from the clients, the described HATEOAS architecture may potentially allow for lighter-weight client(s) as compared to typical systems.

It will be further appreciated that by clustering the logic for a given resource with the corresponding resource server, an improved schema for linking between objects may be realized. As will be discussed in detail below, requests to a HATEOAS server for a particular object may effect collecting of link(s) related to the object and subsequent attaching the link(s) to the object before returning the object to the requesting client. As each resource server is substantially independent (i.e., does not directly interact with a resource of another resource server), it may be possible for each resource server to be queried (e.g., for links associated with a particular object) in parallel and/or for such querying to be substantially order-agnostic. Accordingly, the disclosed embodiments may potentially provide a more resilient and extensible linking schema that is suitable for implementing complex systems. Although an e-commerce system is used herein as an example of a system usable with the described improved HATEOAS REST architecture, it will be appreciated that the architecture may be utilized by any stateful process and/or any data model comprising inter-related information without departing from the scope of the present disclosure.

Figure 1:
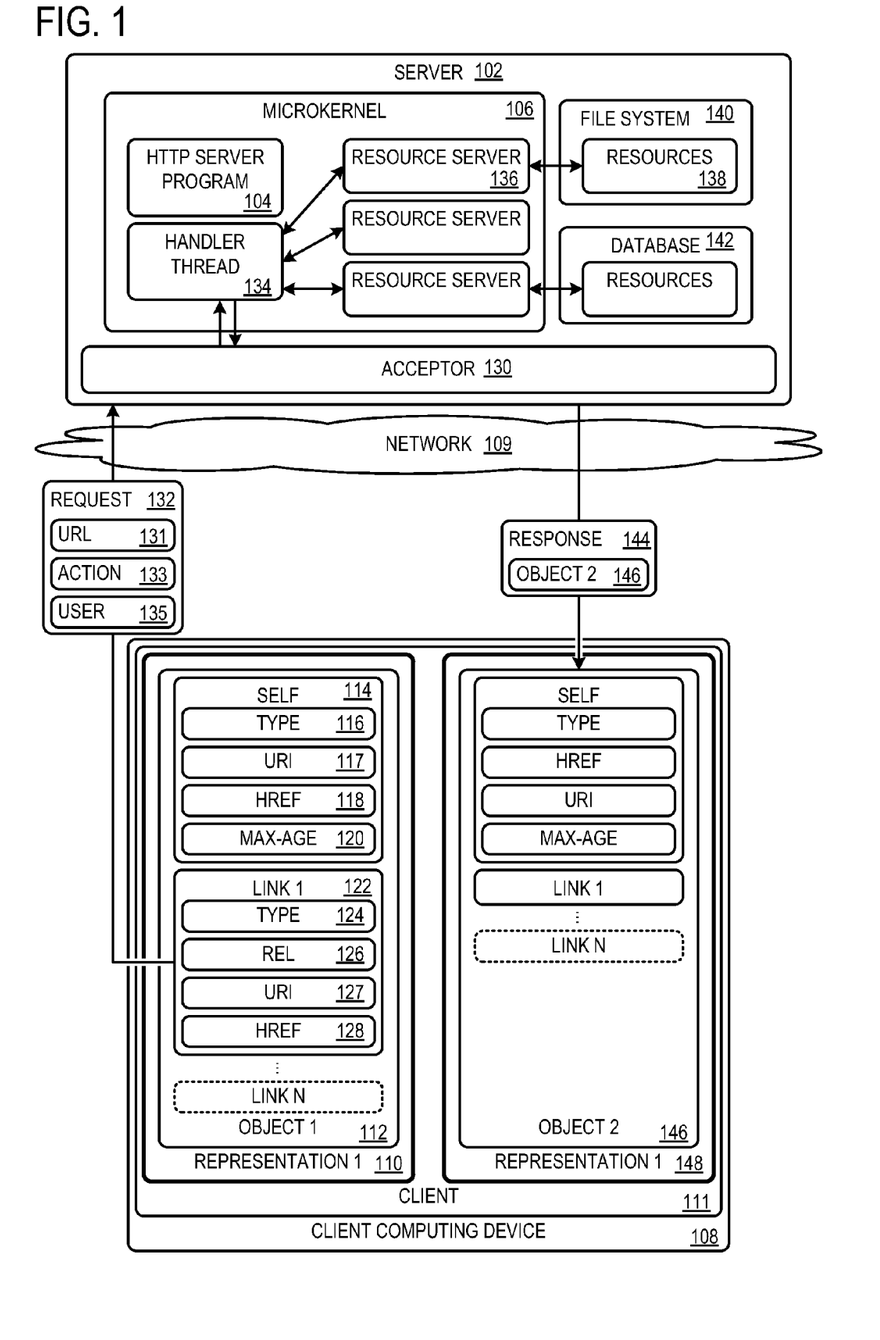
FIG. 1 shows a non-limiting example of a resource in accordance with an embodiment of the present disclosure.

Turning to FIG. 1, an example of an embodiment of a HATEOAS-based client-server system 100 including server 102 configured to execute a HTTP server program 104 via microkernel 106 is illustrated. System 100 further comprises client computing device 108 configured to communicate with server 102 via network 109. Client computing device 108 may provide client 111 (e.g., web browser) so as to facilitate such communication. Client 111 may be configured, for example, to provide representation 110 of a data object 112 (hereinafter "object"). As previously mentioned, the term "representation," as used herein, refers to a specific presentation (e.g., visual, audio, etc.) of an object. It will be understood that each object may be interpreted and presented according to various features, preferences, etc. of each client 111. In other words, a representation of object 112 other than representation 110 may be provided by client(s) other than client 111.

As described above, typical HATEOAS systems rely upon the HTTP protocol implementation to provide low-level functions. Specifically, the MIME-type (also referred to as 'Content-type') component of the HTTP header may be used to define both the representation of the resource and the encoding method. Including additional information within the HTTP header may restrict use of other communication protocol(s), and/or may otherwise negatively affect operation of the system. The typical HATEOAS architecture may therefore not be able to provide the features of an e-commerce system.

Accordingly, it may be desirable to develop an architecture that is protocol-independent, and as such, object 112 includes a "self" entity 114 (e.g., data structure) comprising a plurality of characterizing data that may have otherwise been included in the HTTP header in a typical HATEOAS system. The characterizing data may include, but is not limited to, type 116, Uniform Resource Identifier "URI" 117, HREF 118, and max-age 120.

Type 116 provides a name of a data schema and may be used to define one or more characterizing features of object 112. As one non-limiting example, type 116 of a movie object may be a schema such as "application/vnd.imdb.movie" informing client 111 that the object is a movie. The schema may further indicate to the client what additional field(s), if any, to expect within object 112. For example, the "application/vnd.imdb.movie" schema may be defined to have a field called "rating" that describes the rating of the movie. Thus, upon recognizing an object being of the above-described movie object type, the client may access the "rating" field to determine the rating, if desired. In some embodiments, the additional field(s) may be provided within self entity 114 and/or elsewhere within object 112. It will be understood that the schema does not define the kinds of links to expect, which will be discussed in greater detail below, but rather defines feature(s) of the object, such as the zero or more additional field(s) in the particular object.

URI 117 may identify the resource represented by the object, whereas HREF 118 may identify the location of the resource. In other words, HREF 118 may identify how to access the resource identified by URI 117. For example, HREF 118 may comprise a location of server 102, URI 117 of the particular resource, an action to perform on the resource, and/or a protocol to provide such interaction. As one non-limiting example, URI 117 of a cart-type object of an e-commerce system may be "/store/cart/123," whereas HREF may be "https://www.mystore.com/store/cart/123."

Max-age field 120 indicates a maximum age (e.g., in seconds) from creation/download of object 112 that client 111 may display, or otherwise provide, representation 110 of object 112. Once this maximum age is surpassed, client 111 may be configured to request an updated instance of object 112 from server 102 rather than display representation 110, which is over the aging limit. For example, if a particular object 112 includes max-age field 120 of 86,400 seconds (i.e., 24 hours), client 111 may use this information to cache the object locally so as to avoid further calls to the system (e.g., READ requests) for the object for 24 hours. As mentioned above, typical HATEOAS systems provide information via the HTTP header, and max-age field 120 may constitute at least some of that information. As not all HTTP clients may be able to manage this information in the HTTP headers, typical configurations may effect unnecessary network traffic and server load. Further, by placing field 120 inside object 112, each client 111 may manage its own caching of the object.

Object 112 further comprises zero or more links 122, illustrated as an arbitrary number N links, each defining a relationship between the object and a related resource. Each link 122 may comprise, for example, "TYPE" element 124 defining the type of object returned by the link, "REL" element 126 defining the name of the relationship between object 112 and the returned object, URI element 127 identifying the resource providing the returned object, and "HREF" element 128 defining the location of the linked resource.

One non-limiting example of object 112 is an online shopping cart, as follows. Self entity 114 of the example shopping cart object includes a content type 116 of "application/vnd.elasticpath.cart" and an additional object field called "total-quantity" defined by the content type that indicates how many items are in the cart. In other words, the schema identified via content 116 may alert the receiving client to expect a "total-quantity" field.

```
{
self: {
type: "application/vnd.elasticpath.cart",
href: "http://10.10.30.66/shapi/carts/rockjam/3456",
uri: "/carts/rockjam/3456"
max-age: 0,
},
total-quantity: 10,
links: [
{
type: "application/vnd.elasticpath.links",
href: "http://10.10.30.66/shapi/carts/rockjam/3456/lineitems",
uri: "/carts/rockjam/3456/lineitems",
rel: "lineitems",
rev: "cart"
},
{
type: "application/vnd.elasticpath.order",
href: "http://10.10.30.66/shapi/orders/rockjam/34453",
uri: "/orders/rockjam/34453",
rel: "order",
rev: "cart"
},
{
type: "application/vnd.elasticpath.total",
href: "http://10.10.30.66/shapi/totals/carts/rockjam/3456",
uri: "/totals/carts/rockjam/3456",
rel: "total",
rev: "cart"
}
]
}
```

In combination with self entity 114, links 122 provide all the information necessary to implement a HATEOAS system, as described above. In other words, if object 112 is instructed (e.g., via user interaction, such as "clicking," with representation 110) to perform a state transition (e.g., follow link 122), object 112 includes all information needed to access the link (e.g., how to contact server 102 in order to follow the link) and/or to manipulate the representation itself.

For example, during operation, client 111 may send resource operation request 132 corresponding to a particular link 122 in object 112 downloaded to client computing device 108. The request is defined by HREF element 128 of the particular link 122, and may include, for example, URL 131 indicating a location of the linked resource and action 133 indicating an action (e.g., PUT, GET, POST, or DELETE) to perform on the linked resource. For example, upon following an "add to cart" link, request 132 may include a request to POST an "add to cart" request to the "shopping cart" resource. In some embodiments, the request may further comprise user identifier 135, which will be discussed in greater detail below. Such a request is provided for the purpose of example, and is not intended to be limiting in any manner.

Request 132 is sent to server 102 via computer network 109, and is received at server 102 by acceptor 130 associated with microkernel 106. Acceptor 130 performs processing of request 132, and dispatches the request to an appropriate handler thread 134 of microkernel 106 for further processing. The handler thread, in turn, calls various resource servers 136 associated with various resources 138 in order to retrieve the requested data. For example, as illustrated, resources 138 may be stored in file systems 140 and/or databases 142, or programmatically generated from data stored therein.

Based upon the processing of resource servers 136, response 144 including object 146 is generated, and is subsequently transmitted via network 109 to client computing device 108.

As with object 112, client 111 may be configured, upon receiving object 146, to provide representation 148 of object 146. Specifically, client 111 may be configured to examine type 116 and/or the "REL" element of each link included within object 146 in order to provide representation 148. For example, if client 111 identifies object 146 as a catalog entry (e.g., by examining type 116), and if an "add to cart" link is not present within the object, client 111 may be configured to provide a disabled (e.g., "grayed-out") add-to-cart button via representation 148. In other embodiments, client 111 may be configured to display no "add to cart" button. It will be understood that these scenarios are presented for the purpose of example, and are not intended to be limiting in any manner.

Interaction with representation 148 (e.g., via clicking) may effect transmission of a second resource operation request and subsequent receipt of a third object (not illustrated). It will be appreciated that such interaction may be repeated ad infinitum and/or until a desired state is reached.

Figure 2:
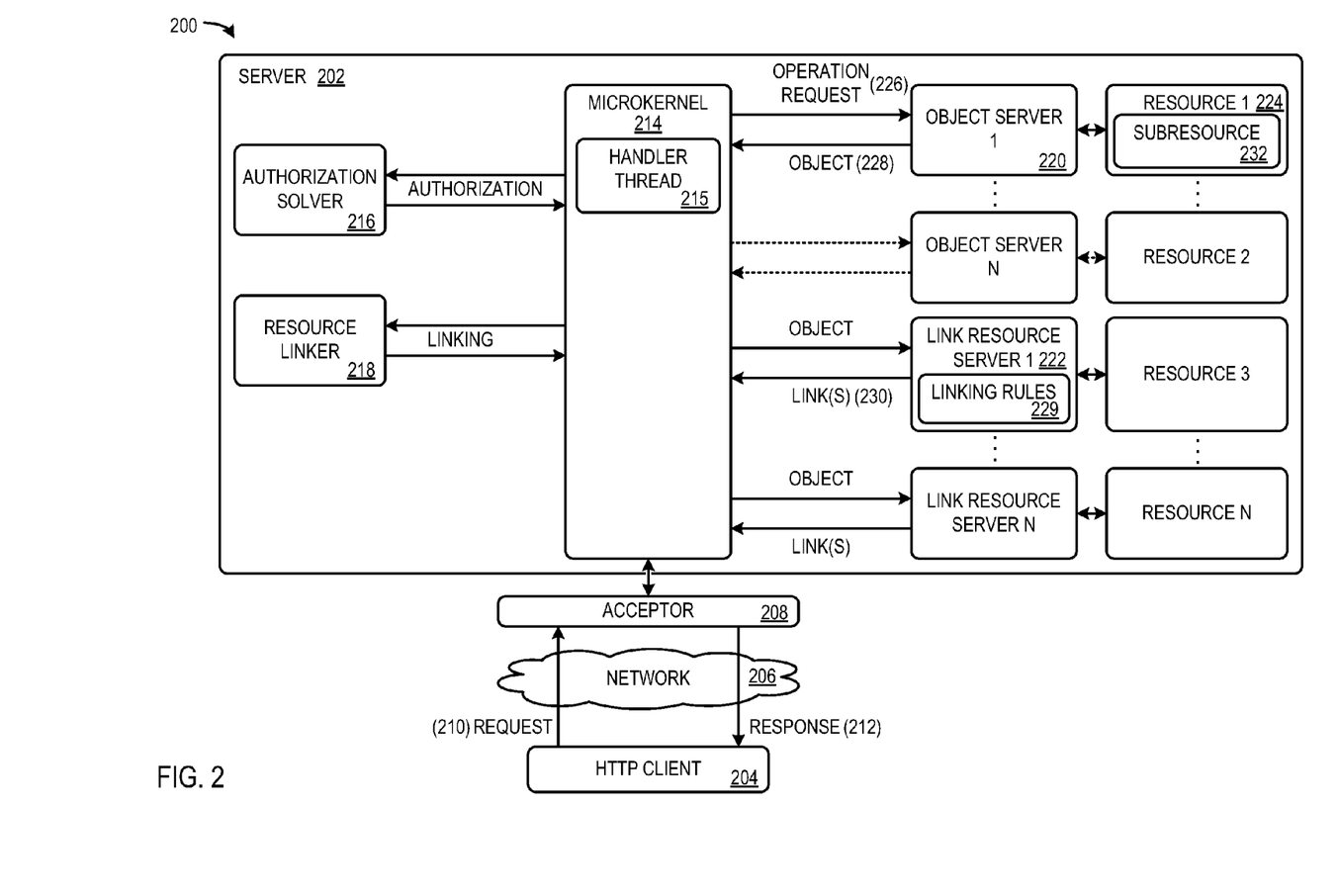
FIG. 2 shows a non-limiting example of a HATEOAS microkernel in accordance with an embodiment of the present disclosure.

Turning now to FIG. 2, a non-limiting example of a HATEOAS system 200 in accordance with another embodiment of the present disclosure is schematically illustrated. System 200 comprises server 202 communicatively coupled to HTTP client 204 via network 206. Server 202 is configured to receive, via acceptor 208, request 210 from client 204 and to send, via the acceptor, response 212. Server 202 includes kernel 214 configured to interact with the remaining elements of the server, thereby acting as the "central communications hub" of server 202. For example, kernel 214 may provide a handler thread 215 to handle the described request-response lifecycle. Server 202 yet further includes authorization solver 216 and resource linker 218. The resource linker may utilize the authorization solver to determine if a particular resource server is authorized to attach links, as is discussed in greater detail below.

Server 202 includes one or more object servers 220 and one or more link resource servers 222, each sometimes referred to as "resource servers." Although object servers 220 and link resource servers 222 are illustrated via an arbitrary number N of object servers and an arbitrary number N of link resource servers, respectively, it will be appreciated that such illustration is provided for ease of understanding, and that server 202 may include additional and/or different resource servers in other embodiments without departing from the scope of the present disclosure. It will be further appreciated that although object servers 220 and link resource servers 222 are illustrated as distinct components, any particular resource server may operate as an object server or a link resource server, depending on the particular request 210, as will be described in more detail below.

The object servers 220 and link resource servers 222 are distinct software programs configured to interact with each other by exchanging, i.e., sending and/or receiving, resource operations via kernel 214. Each resource server operates independently from the others and is the only resource server that serves data objects for its resource. In other words, no resource servers other than the resource server corresponding to a particular resource 224 are able to directly interact with or modify the resource. For example, in the depicted configuration, "Object Server 1" may not directly interact with resources 224 other than "Resource 1." Such a configuration may therefore enable the implementation of business rules and/or other logic associated with a particular resource 224 within the associated resource server. In this way, each object server 220 and/or link resource server 222 is responsible for a particular resource 224 (e.g., e-commerce platform, inventory management system, data management system, database, file system, etc). For example, in an e-commerce scenario, one of the resource servers may be a "price" resource server configured to provide requested price(s), and all pricing-related logic (e.g., bulk discounts, sales, other promotions, etc.) may be implemented by the "price" resource server and only the "price" resource server.

An example request-response lifecycle of system 200 is as follows. Request 210 comprises a request to retrieve (e.g., READ) a particular resource of resources 224. Upon receiving request 210 from client 204 via acceptor 208, kernel 214 is configured to provide the request to the resource server identified by the request. In some embodiments, kernel 214 may be configured to parse the URI identified by the request (e.g., URI derived by acceptor 208 from URL 131) to determine the corresponding resource server. In other embodiments, kernel 214 may be configured to determine the corresponding server via one or more other mechanism(s). As illustrated, kernel 214 provides resource operation request 226 to "Object Server 1," and microkernel 214 receives object 228 in response. Object 228 corresponds to the resource (i.e., "Resource 1") providing the object server, and represents the state of the resource after performance of the resource operation request.

Upon receiving object 228, microkernel 214 is configured to provide the object to resource linker 218 in order to aggregate, and to subsequently attach to the object, any one or more links 230 provided by the remaining resource servers (e.g., by link resource servers 222). In other words, the resource linker is configured to collect links with additional, related information from the other resource servers.

In an example e-commerce scenario, object 228 may represent a product entry in an online catalog. For example, request 210 may comprise a request for a product information "page" for a particular product, where the "page" includes a description, price, and indication of available inventory for the product. Thus, the example object 228 received from the appropriate object server 220 comprises a catalog entry object corresponding to the product. For example, object 228 may comprise a product identifier (e.g., product ID, product title, etc.) and/or additional information such that the remaining resource servers may provide information related to the product (e.g., description, pricing, etc.).

Accordingly, once object 228 is received at resource linker 218 via microkernel 214, the resource linker is configured to provide the object to the one or more link resource servers 222 in order to populate the catalog entry through receipt, and subsequent embedding, of links 230. For example, link resource servers 222 in this scenario may include a price resource server, an inventory resource server, a product description resource server, and a shipping resource server. Each of the resource servers, upon receiving object 228 from the resource linker, may examine the object, and respond with any relevant links 230. Thus, the object may be augmented with price data returned by the price resource server, inventory data returned by the inventory server, description data returned by the product description server, and shipping information returned by the shipping resource server. Generally speaking, each link resource server 222 may implement one or more linking rules 229 (e.g., business rules, other logic, etc.) to determine which link(s) to return for a given object 228. The result of such linking, as discussed above in reference to FIG. 1, is stored within the object, and is eventually returned to the requesting client.

Although the above description pertains to so-called monolithic resources servers (e.g., shipping resource server to provide shipping information), there may be one or more subresources 232 for each of any one or more resources 224 in some embodiments. Each subresource 232 may be utilized to provide additional information to a given resource 224. Accordingly, subresources 225 may be added, deleted, or modified without any update to the associated resource, thereby potentially further increasing the extensibility of system 200. The subresources, along with the rest of the resources, are queried during linking to determine if the subresources have related information. For example, returning to the above e-commerce scenario, although the shipping resource exists to provide shipping information (e.g., shipping method selection, pricing, estimated delivery, etc.), it is each subresource that may define the individual shipping options (e.g., 3-day), etc. Thus, if a new shipping option (e.g., overnight) becomes available, a new subresource 232 can be created to define said option without updating the parent "shipping" resource. In such scenarios, after the shipping resource has handled a "shipping" resource operation, the linker may query the subresources to determine additional details.

In order to provide information related to object 228, each link resource server 222 may be configured to examine the "type" element of object 228 (e.g., TYPE 116), as more than one object encountered by a particular resource server may comprise similar, or equivalent, names (e.g., REL 126). Each resource server may implement one or more functions, and each of these functions may be defined for any one or more object types. In other words, each resource server may be configured to perform type-granular resource operations on a corresponding resource of resources 224. For example, a "shopping cart" resource server may be configured to not provide an "add to cart" link to an object of "image" type, but may be configured to provide such a link to an object of "product" type. As another example, upon encountering an object type for which no corresponding logic exists (e.g., new object type) at a particular resource server, the resource server may be configured to provide no links 230. It will be understood that, depending on the particular use case scenario and/or configuration of server 202, links 230 may include "direct" information and/or "indirect" information (e.g., information usable to programmatically retrieve other information). For example, in some embodiments, the product description resource server may be configured to provide a text-based description of the product such that the information provided in the link(s) is directly usable to provide the product description. In other embodiments where the information is "indirect," the information provided by the product description resource server may be usable by client 204, upon receipt, to programmatically retrieve the product description (e.g., from the product description resource server).

In some instances, one or more of link resource servers 222 may not be able to provide links 230, and may instead perform, in response to the query, a "default action." In some instances, such a default action may include, for example, providing an error status (e.g., "Out of stock" notification), providing a link to an error status (e.g., link to error status with up-to-date information), and/or providing nothing (e.g., no response, response with no data payload, etc.). In other instances, a resource server may provide different and/or additional default actions without departing from the scope of the present disclosure.

Generally speaking, resource linker 218 is configured to collect any information related to object 228. Accordingly, resource linker 218 may be configured to provide object 228 to every resource server of server 202. Thus, the resource linker may be configured to maintain an understanding of all of the resource servers (e.g., via a resource server list, etc.) of server 202. As mentioned previously, each resource server may be substantially independent of the other resource server(s). Therefore, linker 218 may be configured to query the resource servers in any desired order, so long as each resource server is queried. For example, in some embodiments, linker 218 may query one or more of the resource servers in parallel to increase throughput.

Regardless of the order by which the resource servers are queried, the resource server is aware that linking is complete for a particular object once all resource servers have been queried. As object 228 is passed to each resource server, and as each resource server is configured to provide information, i.e., links, independent of the information provided by the other resource server(s), it will be appreciated that the links are not embedded within the object until all link(s) have been collected from all of the resource servers. Once all the links have been collected and embedded in the object, the object is returned to the requesting client.

Although operation of resource linker 218 has been described with reference to interactions between the linker and one or more resource servers, it will be appreciated that such interaction may be provided via kernel 214. As mentioned above, the resource servers are isolated modules configured to interact with each other by exchanging (e.g., sending and/or receiving) resource operations via kernel 214. Accordingly, in order to query a particular resource server, linker 218 may be configured to provide a query resource operation (e.g., READ operation) for the particular resource server to the kernel, and the kernel may subsequently provide the query to the corresponding resource server. Similarly, the link(s) provided by the resource server may be received by linker 218 via kernel 214.

As mentioned above, HATEOAS systems are, by design, typically unaware of the concept of "users," and may therefore be ill-suited for e-commerce scenarios and/or for other applications utilizing user-based permissions, preferences, etc. Accordingly, server system 200 further includes authorization solver 216 so as to provide kernel 214 with user authentication needed for the improved HATEOAS architecture. Specifically, after microkernel 214 receives a resource operation (e.g., resource operation request 226, linking operation requests, etc.), the kernel may be configured to communicate with the authorization solver to ensure that the given resource operation is allowed. In other embodiments, the kernel may forward a subset of the resource operation request data.

For example, in some embodiments, request 210 may further comprise a user identifier (e.g., user identifier 135) indicating the user providing the request. The user identifier may comprise any data, or combination of data, used to determine the permissions of a given user. For example, in some embodiments, the user identifier may be a substantially unique identity (e.g., user name). In other embodiments, the user identifier may define a role (e.g., administrator) with which permissions are associated, and the role may be shared amongst any one or more users. Generally speaking, request 210 may comprise at least some identifying information such that server system 202 may examine this information to determine whether or not the resource operation identified by the request is allowed to be performed.

Accordingly, upon receiving request 210, kernel 214 (e.g., handler 215 of kernel 214) may be configured to determine the user identifier, role identifier, and/or other identifying information, and may thus supply authorization solver 216 with this information. Authorization solver 216 may then be configured to examine the information, and to provide an indication (e.g., yes/no, detailed result, etc.) to kernel 214 as to whether or not the request should be handled. In other embodiments, kernel 214 may forward request 210 to authorization solver without first identifying a user, role, etc. It will be appreciated that these scenarios are presented for the purpose of example, and are not intended to be limiting in any manner. The interaction between the various elements of FIG. 2 will now be discussed in greater detail with reference to FIG. 3.

Figure 3:
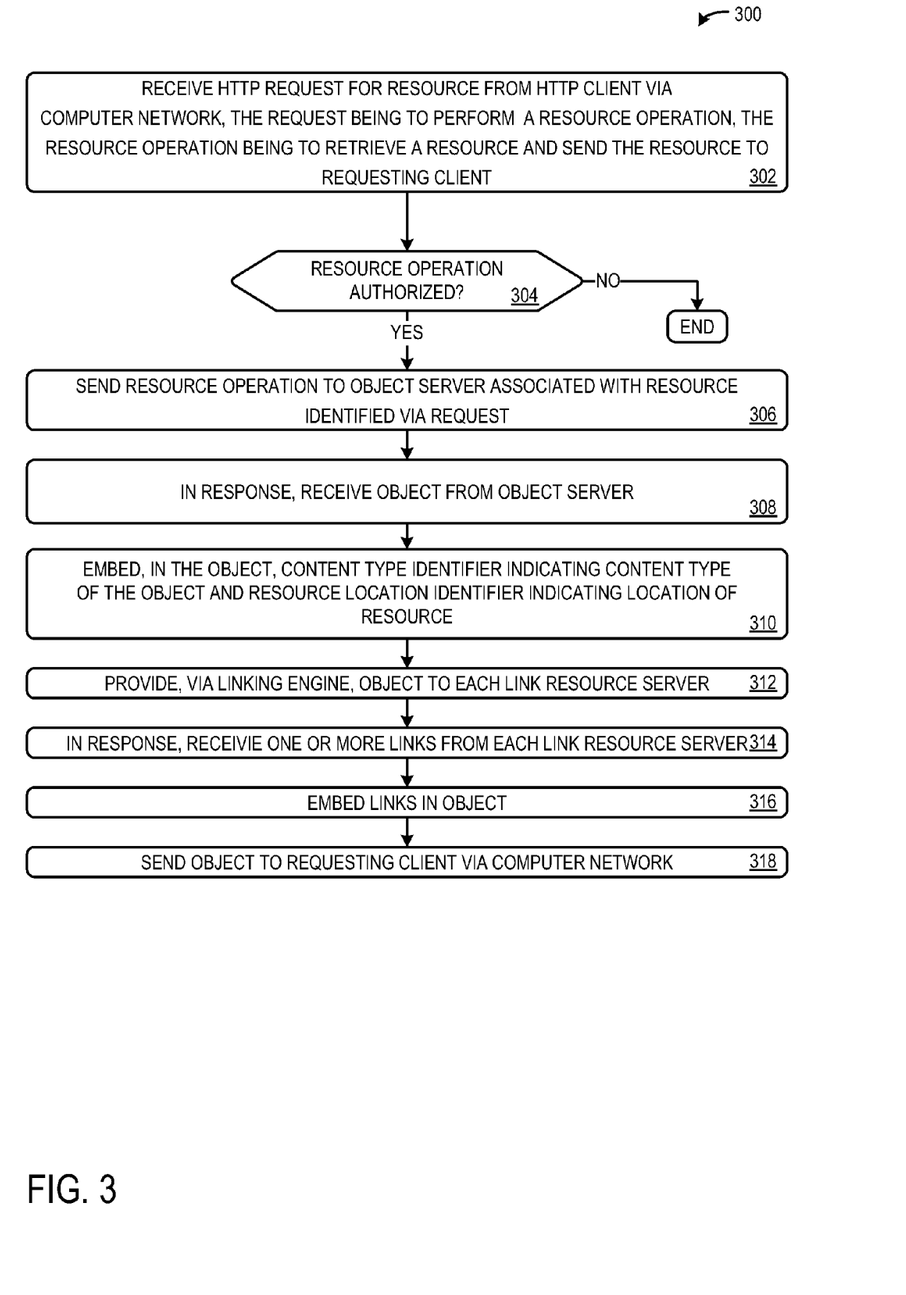
FIG. 3 is a flowchart illustrating a method of serving a resource to a client via a computer network in accordance with one embodiment of the present disclosure.

FIG. 3 illustrates a process flow depicting an embodiment of a method 300 for serving a resource to a client via a computer network at an HTTP server system (e.g., server 102, server 202, etc.) having a stateless microkernel architecture. At 302, method 300 comprises receiving an HTTP request (e.g., request 132) for a resource from an HTTP client via a computer network, where the request is to perform a resource operation. The resource operation may comprise, for example, a request to retrieve the resource (e.g., a READ operation) and send the resource to the requesting client. In order to effect the resource operation, the request may include, for example, a user identifier, a resource URI, and an action to perform on the resource identified by the URI. Although method 300 is described herein with reference to a READ operation, in other scenarios, in accordance with the HATEOAS architecture, the action may be one of: POST, GET, PUT, or DELETE (sometimes referred to as CREATE, READ, UPDATE, and DELETE, respectively). As previously described, the user identifier may comprise any data, or combination of data, used to determine the permissions of a given user.

At 304, method 300 further comprises determining if the resource operation is authorized based on the request. In some embodiments, such a determination may comprise determining a user identifier based on the request and querying an authorization solver (e.g., authorization solver 216) to determine whether a user corresponding to the user identifier is authorized to perform the resource operation. For example, a kernel of the HTTP server system (e.g., kernel 214) may be configured to determine the user identifier from the request (e.g., by parsing the request), and to query the authorization solver by providing the user identifier. In other embodiments, the entire request and/or a different subset of the request may be provided to the authorization solver. If the resource operation is not authorized, method 300 ends, and thus the resource operation is not performed. In some embodiments, a message indicating the operation failure may be sent to the requesting client.

However, if the resource operation is authorized, method 300 further comprises, at 306, sending the resource operation to an object server associated with the resource identified by the request. For example, as mentioned above, the kernel of the server system may be configured to determine the user identifier by parsing the user request, and such parsing may further comprise parsing a link included in the request to identify the requested resource. In other embodiments, parsing of the link may be performed upon determining that the resource operation is allowed. Nonetheless, determining which particular resource is requested may be accomplished by recognizing a URI of the resource within the request. These scenarios are presented for the purpose of example, and are not intended to be limiting in any manner.

In response to sending the resource operation to the object server, method 300 further comprises, at 308, receiving an object from the object server, where the object represents the resource upon performance of the resource operation. In other words, the object may represent the "result" of the resource operation. For example, as the request includes a GET (READ) action (e.g., retrieve the resource), the object may represent the state of the resource upon performance of the GET action. In other embodiments where the request includes a POST (UPDATE) action (e.g., update the resource with new information), the object may represent the state of the resource after the resource has been updated with the new information.

At 310, method 300 further comprises embedding, in the object, a content type identifier (e.g., TYPE 116) indicating a content type of the object and a resource location identifier (e.g., HREF 118) indicating a location of the resource. As mentioned previously, typical HATEOAS systems embed such identifying information within the HTTP header itself. However, as this increases dependency upon the HTTP protocol itself, such a configuration may not provide suitable extensibility and/or may be otherwise undesirable. Accordingly, by embedding the information within the object, the identifying information remains with the object while freeing the HTTP header to provide the "standard" functionality.

As described above, handling of a READ operation may include not just returning a particular object (if at all), but may also comprise determining related information. For example, if the request received at 302 includes a request for an online shopping cart, merely returning the shopping cart object (e.g., cart comprising a list of items) without related information (e.g., price, inventory, etc.) may be undesirable. In such scenarios, the client may be configured to provide one or more calls for the additional information, thereby increasing the complexity of the client and/or decreasing throughput. As such, it may be desirable to both determine the related information and attach the information to the object before returning the object to the requesting client.

Accordingly, at 312, method 300 further comprises providing, via a linking engine (e.g., resource linker 218), the object to each link resource server of the one or more link resource servers. As discussed above, the resource linker is configured to query each of the resource servers to determine if said resources servers are aware of any information related to the resource operation. Said querying may be accomplished, for example, by utilizing the method of FIG. 3. In other words, the linker may query the resource servers by constructing a resource operation for each resource server. In some embodiments, authorization may be performed instead of, or in addition to, the authorization performed at 304. For example, authorization may be performed upon receiving the object and/or before providing each linking resource operation.

As said resource operations result from a "primary" resource operation, said resource operations may be referred to as "secondary" resource operations. By allowing non-kernel elements of the microkernel to query other elements, each element does not need to be "aware" of the state of any other resource since the state can be queried as needed. Such a configuration ensures that only the appropriate resource server acts upon a given resource operation, and that any other resource server must interact with the resource server instead of directly accessing the resource.

In order to provide the related information, each link resource server may be configured to examine the (embedded) content type of the object. Generally speaking, each link resource server includes "linking rules" (e.g., business rules, other logic, etc.) for one or more object types. Accordingly, upon recognizing the content type of the object as a content type for which linking rule(s) exist, each resource server is configured to return one or more links according to the linking rules corresponding to the content type of the object. As mentioned above, if a particular link resource server does not recognize the object type, or otherwise cannot provide a response to the query, the link resource server may be configured to provide a "default action." It will be understood that each resource server receives the object, and does not receive any links provided by the other resource servers. In other words, there may exist no pre-defined order by which the resource servers are queried, and instead the resource servers may be queried in any particular order, so long as each of the link resource servers is queried. In some embodiments, two or more of the resource servers may be queried in parallel.

Thus, in response to the provision at 312, method 300 further comprises, at 314, receiving one or more links from each of the one or more link resource servers. In some instances, there may be no suitable links. At 316, method 300 further comprises embedding the links in the object (e.g., within a "links" data structure/field/etc.). Upon embedding the links, method 300 comprises sending the object to the requesting client via the computer network at 318.

Figure 4:
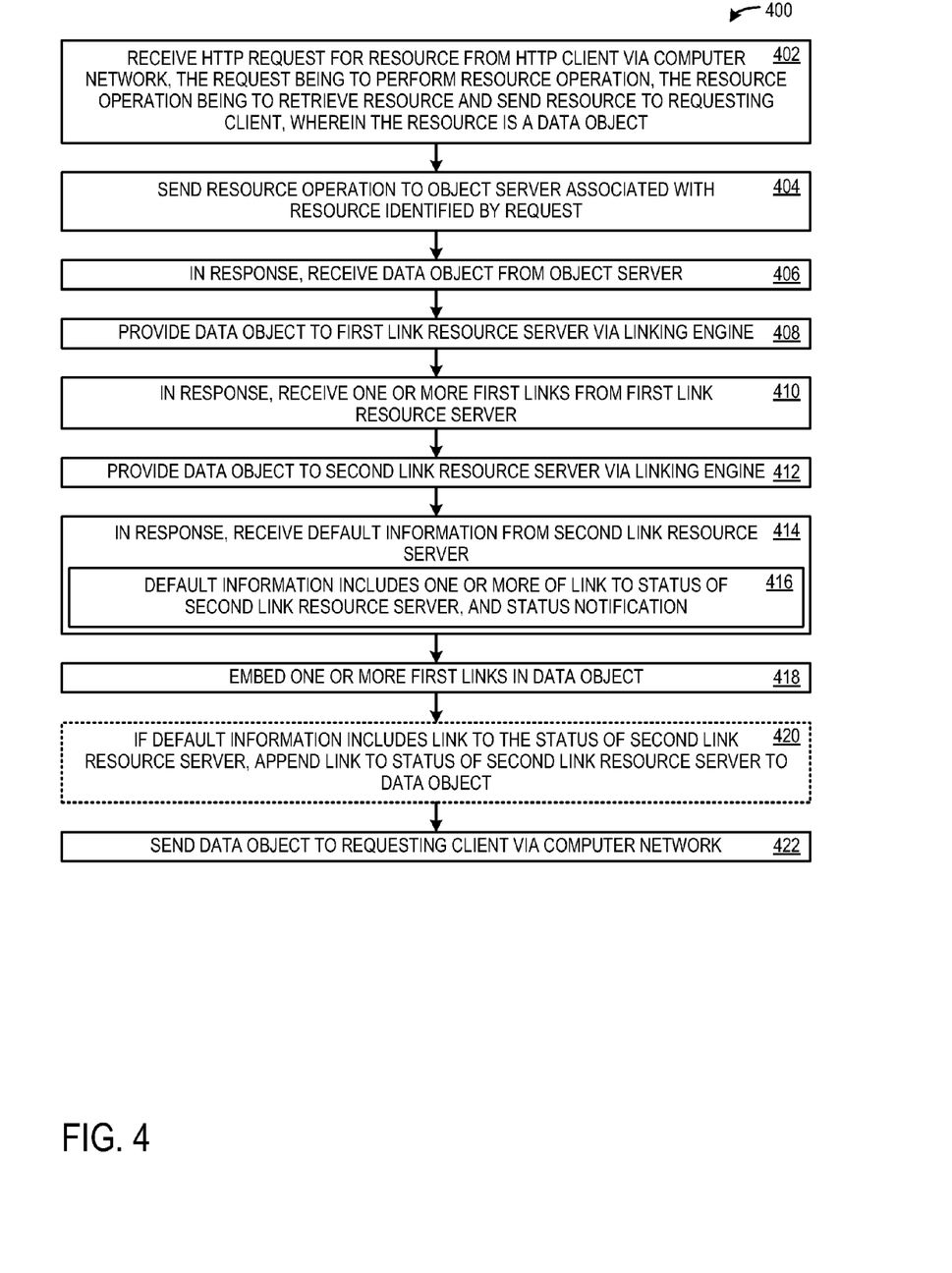
FIG. 4 is a flowchart illustrating a method of operating a stateless microkernel architecture server in accordance with one embodiment of the present disclosure.

Turning now to FIG. 4, a process flow depicting an embodiment of a method 400 for operating a stateless microkernel architecture server including a first link resource server and a second link resource server is illustrated. At 402, method 400 comprises receiving an HTTP request for a resource from an HTTP client via a computer network, the request being to perform a resource operation, the resource operation being to retrieve the resource and send the resource to the requesting client, wherein the resource is a data object.

At 404, method 400 comprises sending the resource operation to an object server associated with the resource identified by the request. At 406, method 400 further comprises, in response, receiving the data object from the object server, and, at 408, embedding, in the data object, a content type identifier indicating the a content type of the data object and a resource location identifier indicating a location of the resource. In other words, the requested data object has been received and the identifier(s) have been embedded in the object. However, it will be appreciated from the preceding discussion that one or more link resource servers may maintain information that is related to the data object.

Accordingly, at 408, method 400 further comprises providing the data object to the first link resource server via a linking engine. In response, at 410, method 400 further comprises receiving one or more first links from the first link resource server. Similarly, at 412, method 400 comprises providing the data object to the second link resource server via the linking engine, Method 400 further comprises, at 414, in response, receiving default information from the second link resource server. The default information may be received, for example, if the second link resource server does not maintain information related to the object and/or if the second link resource server is unavailable. As previously mentioned and as illustrated at 416, the default information may include one or more of a link to a status of the second link resource server, and a status notification.

Method 400 further comprises, at 418, embedding the one or more first links in the data object. In some embodiments, method 400 may further comprise, at 420, if the default information includes the link to the status of the second link resource server, appending the link to the status of the second link resource server to the data object before sending the object to the requesting client. In other words, if the default information includes a link, the link is embedded in the object. At 422, method 400 further comprises sending the object to the requesting client via the computer network.

The above systems and methods may be utilized to realize a complex, stateful system according to the REST HATEOAS architecture. Generally speaking, by clustering business rules and/or other logic associated with a particular resource around the associated resource server, each resource may be individually maintained while still providing for instantiation of inter-resource relationships. Further, as each resource server is substantially independent of the other resource servers, such a configuration may provide greater extensibility by enabling resource-granular updating of the logic. Yet further, by implementing the complex logic within the server as opposed to the clients, the described systems may potentially allow for lighter-weight client(s) as compared to typical client-server systems.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A method of serving a resource to a client via a computer network, the method comprising:
    at an HTTP server system having a stateless microkernel architecture, the server system including one or more link resource servers,
    receiving an HTTP request for a resource from an HTTP client via a computer network, the request being to perform a resource operation, the resource operation being to retrieve the resource and send the resource to the requesting client, wherein the resource is a data object;
    determining if the resource operation is authorized based on the request; and
    if the resource operation is authorized:
        sending the resource operation to an object server associated with the resource identified by the request,
        in response, receiving a data object from the object server,
        providing, via a linking engine, the data object to each link resource server of the one or more link resource servers,
        in response, receiving zero or more links from each of the one or more link resource servers,
        embedding the links in the data object, and
        sending the data object to the requesting client via the computer network.

2. The method of claim 1, wherein determining if the operation is authorized comprises:
    determining a user identifier based on the request; and
    querying an authorization solver to determine whether a user corresponding to the user identifier is authorized to perform the resource operation.

3. The method of claim 1, further comprising:
    embedding in the data object a content type identifier indicating content type of the data object and a resource location identifier indicating a location of the resource,
    wherein each link resource server includes linking rules for one or more object types, wherein each link resource server is configured to examine the content type of the data object, and to return one or more links according to the linking rules corresponding to the content type of the data object.

4. The method of claim 3, wherein each link resource server further includes one or more default actions, wherein each resource linker is configured to perform the default actions if the link resource server does not include linking rules for the content type of the data object.

5. The server of claim 4, wherein the default action includes one or more of providing a link to a status of the resource server, providing a status notification, and providing no information.

6. The method of claim 1, wherein each link includes a linked content type identifier, a link target, and a link relationship, wherein the link relationship is usable by the client device to provide a representation of the link to a user of the client.

7. The method of claim 6, wherein at least one of the links is usable by the client to programmatically retrieve a data object from an object server accessible via the link target.

8. The method of claim 1, wherein the data object is an online shopping cart, wherein the link resource servers include a product resource server, a pricing resource server, and a shipping resource server.

9. The method of claim 1, wherein the data object is provided to the link resource servers in an order agnostic manner.

10. A stateless microkernel architecture server, comprising:
　a plurality resource servers each provided by a resource of a plurality of resources, the plurality of resource servers including one or more object servers and one or more link resource servers;
　a microkernel configured to:
　　receive a request for a resource data object from a client via a computer network, the request being to perform a resource operation, the resource operation being to retrieve the resource data object and send the resource data object to the requesting client;
　　retrieve the resource data object from an object server, and
　　embed a content type identifier in the object; and
　a linking engine configured to:
　　receive the resource data object from the microkernel;
　　provide the resource data object to each link resource server of the one or more link resource servers,
　　in response, receive one or more links from the link resource servers, and
　　embed the received links in the object,
　　send the object to the requesting client via the computer network.

11. The server of claim 10, wherein retrieving the data object from the object server provided by the resource comprises:
　identifying the resource identified via the request by parsing a link included in the request;
　providing, to the object server provided by the resource, a resource operation request to perform the resource operation; and
　receiving the data object from the object server.

12. The server of claim 11, wherein each link resource server is configured to:
　receive the data object from the linking engine via the microkernel;
　examine the content type identifier of the data object;
　determine one or more links based on the content type identifier of the data object; and
　provide the one or more links to the linking engine for inclusion in the data object.

13. The server of claim 12, wherein each link resource server includes linking rules for one or more object types, where each link resource server is configured to determine the one or more links by:
　determining if linking rules exist for an object type indicated by the content type identifier of the data object;
　if linking rules do exist for the object type indicated by the content type identifier, providing one or more links based on the linking rules for the object type of the data object; and
　if linking rules do not exist for the object type indicated by the content type identifier, providing default information.

14. The server of claim 13, wherein providing default information includes one or more of providing a link to a status of the link resource server, providing a status notification, and providing no information.

15. The server of claim 10, wherein the linking engine is configured to provide the data object to each link resource server of the one or more link resource servers by:
　providing, for each link resource server, a resource operation request to the microkernel, the resource operation being to retrieve the one or more links from the link resource server; and
　in response, receive one or more links from each link resource server via the microkernel.

16. The server of claim 10, further comprising an authorization solver, wherein the microkernel is further configured to, upon receiving the request from the client:
　determine a user identifier based on the request; and
　query the authorization solver to determine whether a user corresponding to the user identifier is authorized to perform the resource operation,
　wherein the resource operation is sent to the object server if the user is authorized to perform the resource operation.

17. A method for operating a stateless microkernel architecture server including a first link resource server and a second link resource server, the method comprising:
　receiving an HTTP request for a resource from an HTTP client via a computer network, the request being to perform a resource operation, the resource operation being to retrieve the resource and send the resource to the requesting client, wherein the resource is a data object;
　sending the resource operation to an object server associated with the resource identified by the request;
　in response, receiving the data object from the object server;
　embedding, in the data object, a content type identifier indicating the a content type of the data object and a resource location identifier indicating a location of the resource;
　providing the data object to the first link resource server via a linking engine;
　in response, receiving one or more first links from the first link resource server;
　providing the data object to the second link resource server via the linking engine;
　in response, receiving default information from the second link resource server;
　embedding the one or more first links in the data object; and
　sending the data object to the requesting client via the computer network.

18. The method of claim 17, wherein the default information includes one or more of a link to a status of the second link resource server, and a status notification.

19. The method of claim 18, the method further comprising, if the default information includes the link to the status of the second link resource server, appending the link to the status of the second link resource server to the data object before sending the object to the requesting client.

20. The method of claim 17, wherein the data object represents a saleable good, wherein the first link resource server is a price resource server, wherein the one or more first links each include a link to a price of the saleable good, wherein the second link resource server is an online shopping cart resource server, wherein the default information indicates that the saleable good may not be added to an online shopping cart maintained by the second link resource server.

* * * * *